(12) United States Patent
Rakpongsiri et al.

(10) Patent No.: US 7,896,218 B2
(45) Date of Patent: Mar. 1, 2011

(54) APPARATUS AND METHOD FOR CONDUCTIVE METAL BALL BONDING WITH ELECTROSTATIC DISCHARGE DETECTION

(75) Inventors: Pornchai Rakpongsiri, Pratumthani (TH); Jeerasak Potham, Pratumthani (TH)

(73) Assignee: Western Digital Technologies, Inc., Irvine, CA (US)

( * ) Notice: Subject to any disclaimer, the term of this patent is extended or adjusted under 35 U.S.C. 154(b) by 872 days.

(21) Appl. No.: 11/770,328

(22) Filed: Jun. 28, 2007

(65) Prior Publication Data

US 2009/0001064 A1  Jan. 1, 2009

(51) Int. Cl.
B23K 31/02 (2006.01)
(52) U.S. Cl. ............ 228/103; 228/4.5; 228/180.5
(58) Field of Classification Search ............ None
See application file for complete search history.

(56) References Cited

U.S. PATENT DOCUMENTS

| | | | |
|---|---|---|---|
| 4,213,556 A * | 7/1980 | Persson et al. ............ 228/104 |
| 4,341,574 A | 7/1982 | Landes |
| 4,555,052 A * | 11/1985 | Kurtz et al. ............ 228/104 |
| 4,597,519 A | 7/1986 | Kurtz et al. |
| 4,786,860 A * | 11/1988 | Zimmerman ............ 73/588 |
| 4,821,944 A * | 4/1989 | Tsumura ............ 228/110.1 |
| 4,824,005 A | 4/1989 | Smith, Jr. |
| 4,925,083 A | 5/1990 | Farassat et al. |
| 5,016,803 A * | 5/1991 | Ohashi et al. ............ 228/4.5 |
| 5,058,979 A * | 10/1991 | Yamauchi et al. ............ 385/28 |
| 5,110,032 A * | 5/1992 | Akiyama et al. ............ 228/102 |
| 5,213,249 A * | 5/1993 | Long et al. ............ 228/102 |
| 5,263,631 A * | 11/1993 | Felber ............ 228/4.5 |
| 5,277,354 A | 1/1994 | Farassat |
| 5,433,369 A * | 7/1995 | Okumura ............ 228/110.1 |
| 5,468,927 A * | 11/1995 | Terakado ............ 219/56.21 |
| 5,591,920 A * | 1/1997 | Price et al. ............ 73/828 |
| 5,645,210 A * | 7/1997 | Toner et al. ............ 228/102 |
| 5,653,380 A * | 8/1997 | Haji ............ 228/180.5 |
| 5,890,643 A * | 4/1999 | Razon et al. ............ 228/1.1 |
| 5,988,482 A * | 11/1999 | Sasakura et al. ............ 228/103 |
| 6,079,607 A | 6/2000 | Nichter |
| 6,179,197 B1 * | 1/2001 | Toner ............ 228/102 |
| 6,247,629 B1 * | 6/2001 | Jacobson et al. ............ 228/4.5 |
| 6,492,828 B2 * | 12/2002 | Ming-Hsun et al. ............ 324/763 |
| 6,667,625 B1 * | 12/2003 | Miller ............ 324/525 |
| 6,905,350 B1 | 6/2005 | Wallash et al. |
| 7,000,822 B2 * | 2/2006 | Dacanay et al. ............ 228/180.5 |
| 7,124,927 B2 | 10/2006 | Reiber |
| 7,686,204 B2 * | 3/2010 | Takahashi et al. ............ 228/103 |

(Continued)

FOREIGN PATENT DOCUMENTS

JP  55-113338 A  *  9/1980

*Primary Examiner*—Kiley Stoner

(57) ABSTRACT

An apparatus for bonding a conductive lead to a conductive terminal of a device by the use of a conductive metal ball is disclosed and claimed. A ball-forming wire comprises a first conductive metal having a first melting temperature. A clamping surface has a closed position in contact with the ball-forming wire. A wire-clamping actuator is coupled to the clamping surface and is electrically connected to a clamping signal source. A sparking pin comprises a second conductive metal having a second melting temperature higher than the first melting temperature. The sparking pin is electrically connected to a power source. A current detection transformer includes a magnetic core at least partially encircling the ball-forming wire. An analyzing circuit is electrically connected to the current detection transformer.

14 Claims, 3 Drawing Sheets

U.S. PATENT DOCUMENTS

| | | | |
|---|---|---|---|
| 2003/0029901 A1* | 2/2003 | Ming-Hsun et al. | 228/4.5 |
| 2005/0061849 A1* | 3/2005 | Takahashi | 228/4.5 |
| 2005/0133563 A1* | 6/2005 | Kim et al. | 228/4.5 |
| 2005/0184131 A1* | 8/2005 | Kondo | 228/180.5 |
| 2007/0187470 A1* | 8/2007 | Tei | 228/180.5 |
| 2008/0099532 A1* | 5/2008 | Nakao et al. | 228/102 |
| 2009/0001573 A1* | 1/2009 | Jirawongsapiwat et al. | 257/738 |
| 2010/0051670 A1* | 3/2010 | Okafuji | 228/102 |
| 2010/0133322 A1* | 6/2010 | Takahashi et al. | 228/102 |
| 2010/0155455 A1* | 6/2010 | Mii et al. | 228/102 |

* cited by examiner

APPARATUS AND METHOD FOR CONDUCTIVE METAL BALL BONDING WITH ELECTROSTATIC DISCHARGE DETECTION

FIELD OF THE INVENTION

The present invention relates generally to conductive metal ball bonding, and in particular to electrical connection to a magnetic read head by conductive metal ball bonding.

BACKGROUND

Conductive metal ball bonding is one of the methods used in the electronics industry for electrical connection of conductive leads to electronic devices such as devices fabricated from a wafer (e.g. chips). Typically, the conductive leads and corresponding bond pads on the electronic devices are coated with the same conductive metal as the conductive metal balls used for electrical connection, to facilitate joining of the metal through the addition of energy. Typically, the conductive metal coatings and the conductive metal balls comprise gold, and the added energy comprises ultrasonic waves and/or heating. For example, U.S. Pat. No. 4,925,083 describes a method and apparatus for gold ball bonding.

One of the applications for gold ball bonding (GBB) is the fabrication of head-gimbal assemblies (HGAs) for hard disk drives. HGAs include heads for reading and writing data from and to a disk. In magnetic recording applications, the head typically includes a slider and a magnetic transducer that comprises a writer and a read element. The slider is cut from a ceramic wafer (typically AlTiC) upon which the magnetic transducer is fabricated by photolithographic and vacuum deposition and etching techniques. In optical and magneto-optical recording applications, the head may include a mirror and an objective lens for focusing laser light on to an adjacent disk surface. During operation, an "air bearing surface" (ABS) of the slider is separated from the disk by a thin gas lubrication film that is typically referred to as an "air bearing."

For example, FIG. 1 depicts a distal portion of a contemporary HGA 100 that includes magnetic recording head 102. Head 102 comprises air bearing slider 104 and magnetic transducer 106. The magnetic transducer's writer may be of a longitudinal or perpendicular design, and the read element of the magnetic transducer is typically magnetoresistive (MR). The head 102 is adhered to a gimbal 112 of a suspension assembly 110. Suspension assembly 110 also includes a load beam 114, a bend region (not shown), and a swage plate (not shown). The suspension assembly 110 acts to preload the air bearing slider against the surface of the disk.

The suspension assembly of an HGA constrains the motion of the head along or about certain axes, while being compliant to motion of the head along or about other axes. For example, the suspension assembly includes a load beam that extends from a bend region that permits motion towards and away from the disk, while preloading the head against the disk and constraining translation parallel to the surface of the disk. Also for example, the suspension assembly includes a dimple about which the head may pivot, but which constrains translation between the head and the load beam. Also for example, the suspension assembly includes a gimbal to which the head is bonded, the gimbal being compliant to pitch and roll motions of the head but constraining yaw motions of the head.

In modern disk drives, the gimbal also performs the function of carrying leads for electrical connection to the head. Typically, the modern gimbal comprises a laminated structure having a structural layer and conductive leads, separated by a dielectric layer. The leads terminate adjacent a face of the slider that includes bond pads for the magnetic transducer device. The face of the slider containing the bond pads is typically orthogonal to the plane of the gimbal's conductive leads. Therefore corresponding electrical connections must be made through a 90° angle, which is a requirement that can be satisfied by conductive metal ball bonding.

For example, in FIG. 1 gimbal traces 116 are electrically connected to bond pads 108 on the head by conductive balls 120. Note that the HGA of FIG. 1 is shown in a state of incomplete fabrication because not all of bond pads 108 have yet been connected to gimbal traces 116 by conductive balls 120.

The bond pads on the slider, and the regions of termination of the gimbal's conductive leads, are often coated with gold (e.g. by plating), with gold balls used to connect the gimbal's conductive leads to the bond pads of the magnetic transducer device. The gold balls can be fused to the gold coatings on the gimbal's conductive leads and the bond pads of the magnetic transducer device using ultrasonic energy.

However, modern magnetic transducer devices used in read heads for disk drives are extremely sensitive to electrostatic discharge (ESD). For example, MR read elements of all types are easily damaged by ESD, and tunneling MR read elements (a.k.a. "TMR" read elements) in particular are very easily damaged by ESD even at modest voltages. Prior art methods for protecting MR read elements from damage due to ESD have had limited success for various reasons. For example, some prior art methods have undesirably and/or excessively complicated wafer-processing steps during manufacture of the magnetic recording heads. Other prior art methods are too inconvenient to be used in a high-volume manufacturing environment, or require equipment that is too costly to be implemented in a high-volume manufacturing environment. Other prior art methods offer insufficient ESD protection and/or do not afford protection early enough in the manufacturing process. For example, TMR read elements are particularly vulnerable to ESD damage during the manufacturing process before the bond pads of the head are electrically connected to the gimbal's conductive leads (which may themselves connect to some protective circuitry).

Consequently, ESD damage to magnetic transducer devices during the GBB process of high-volume HGA manufacture can significantly reduce manufacturing yield. Moreover, if such damage is not detected right away, the damaged devices may be assembled into more costly components later in the manufacturing process, such as finished head stack assemblies (HSAs), each containing many HGAs, or even head disk assemblies (HDAs), each including an HSA as well as other costly components (e.g. one or more disks, a spindle motor, etc). Of course, if the damaged magnetic transducer device is assembled into one of these more costly components later in the manufacturing process, it is likely to render the more costly component inoperable, leading to even greater waste, and lowering manufacturing yield still further. Thus, there is a need in the art for a practical method to detect ESD during metal ball bonding in a high-volume manufacturing environment.

SUMMARY

An apparatus for bonding a conductive lead to a conductive terminal of a device by the use of a conductive metal ball is disclosed and claimed. A ball-forming wire comprises a first conductive metal having a first melting temperature. A clamping surface has a closed position in contact with the ball-forming wire. A wire-clamping actuator is coupled to the clamping surface and is electrically connected to a clamping signal source. A sparking pin comprises a second conductive metal having a second melting temperature higher than the first melting temperature. The sparking pin is electrically connected to a power source. A current detection transformer includes a magnetic core at least partially encircling the ball-forming wire. An analyzing circuit is electrically connected to the current detection transformer.

DESCRIPTION OF THE PREFERRED EMBODIMENTS

Figure 1:
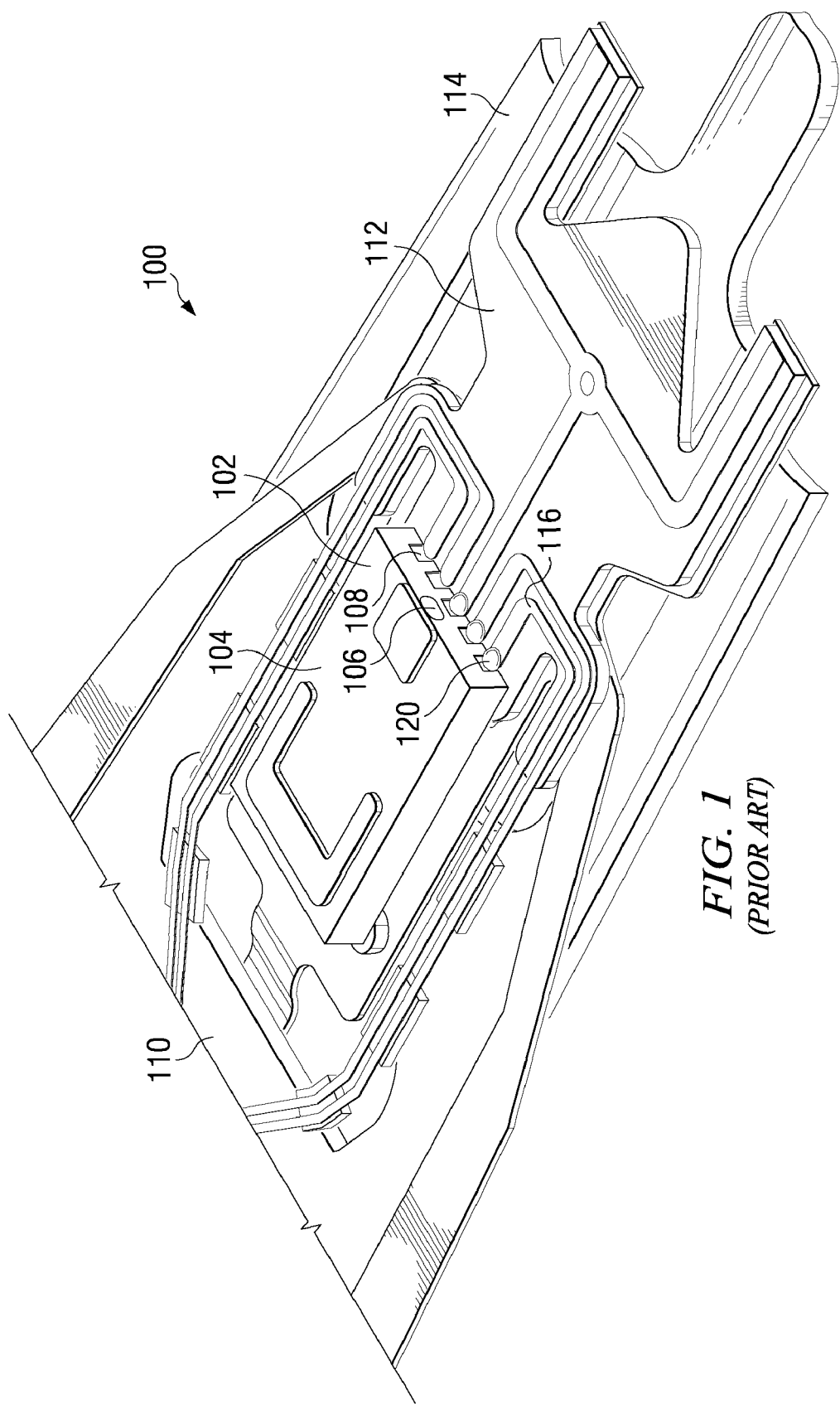
FIG. 1 depicts a distal portion of a contemporary head gimbal assembly.
Figure 2:
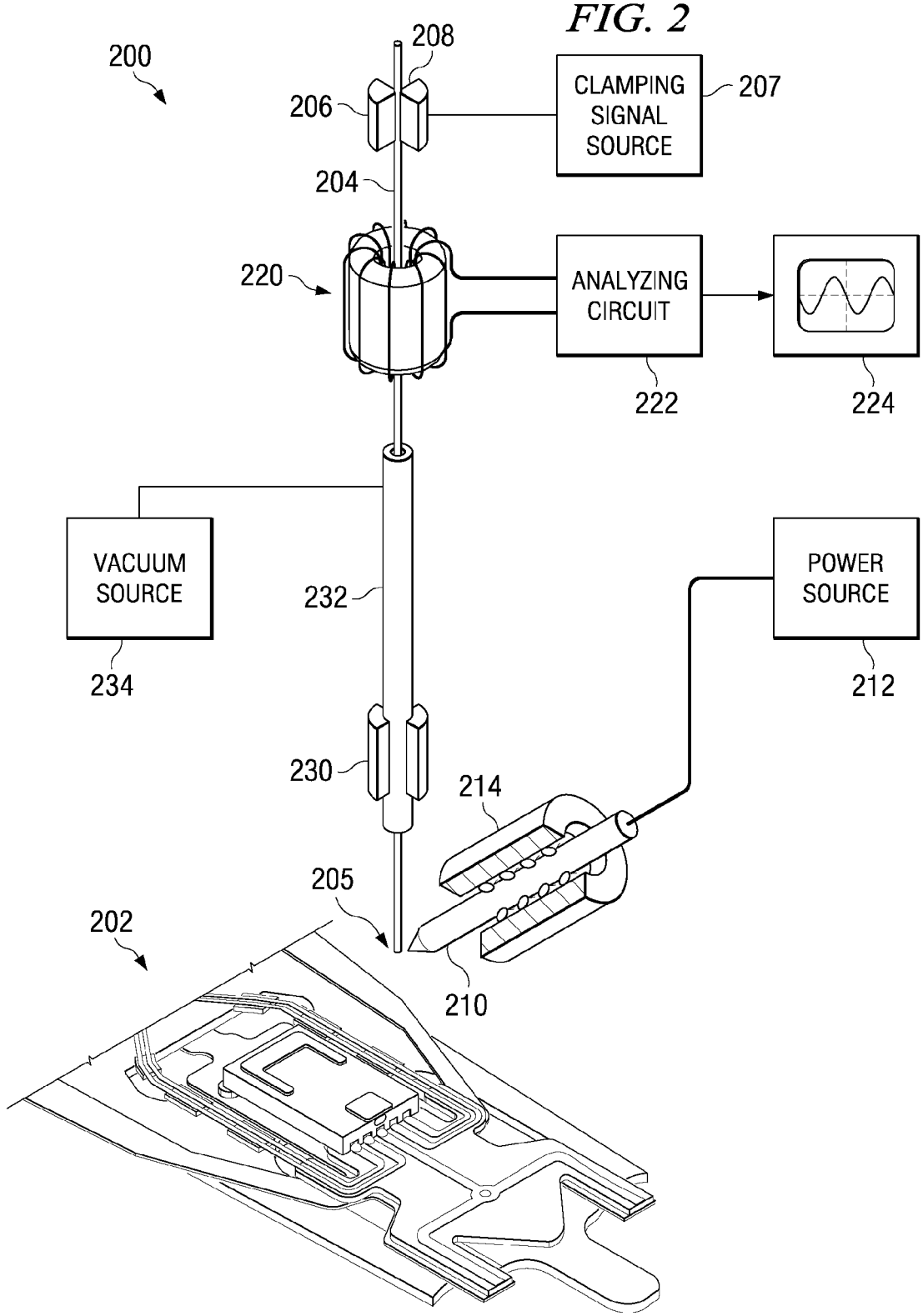
FIG. 2 is a schematic depiction of an apparatus for conductive metal ball bonding according to an embodiment of the present invention.

FIG. 2 is a schematic depiction of an apparatus 200 for bonding a conductive lead pertaining to a target component 202 to a conductive terminal of a device pertaining to the target component 202, by the use of a conductive metal ball, according to an exemplary embodiment of the present invention. For example, the device may be a magnetic recording head transducer and the target component 202 may be an HGA.

Apparatus 200 includes a ball-forming wire 204 that comprises a first conductive metal having a first melting temperature. For example, the first conductive metal may comprise gold, lead, and/or tin. Wire-clamping actuator 206 is electrically connected to, and is driven by a clamping signal source 207, and includes a clamping surface 208 that has a closed position in contact with the ball-forming wire 204. For example, the wire-clamping actuator 206 may include a piezoelectric material, and the clamping surface 208 may be the surface of the piezoelectric material.

Apparatus 200 may include a wire actuator 230, with the ball-forming wire 204 passing through an aperture in the wire actuator 230. Preferably, the wire actuator 230 has a bonding position in which the distal end 205 of the ball-forming wire 204 is adjacent a conductive terminal of the target component 202, and a tip-melting position in which the distal end 205 of the ball-forming wire 204 is not adjacent target component 202. For example, in the embodiment of FIG. 2, the wire actuator 230 includes an aperture in the form of a capillary tube 232 that is in fluid communication with a vacuum source 234.

Apparatus 200 may also include a target actuator coupled to the target component. The target actuator (if any) is not shown in FIG. 2 because, for clarity, target component 202 has been exaggerated in size rather than being shown to scale relative to apparatus 200. The target actuator may be a conventional stage or conveyor for automating the movement of target components and or frames holding multiple target components through one or more manufacturing apparatuses. Preferably, the target actuator will have a bonding position in which the distal end 205 of the ball-forming wire 204 is adjacent a terminal of the target component 202, and a queue position in which the distal end 205 of the ball-forming wire 204 is not adjacent the terminal of target component 202.

Apparatus 200 also includes a sparking pin 210 comprising a second conductive metal having a second melting temperature higher than the first melting temperature. For example, the second conductive metal may comprise tungsten or steel. The sparking pin 210 may be electrically connected to a power source 212 via an automated switch (e.g. a relay switch). The sparking pin 210 is preferably attached to a pin-translating actuator 214 that has a sparking position in which the sparking pin 210 is relatively closer to the distal end 205 of the ball-forming wire 204, and a non-sparking position in which the sparking pin 210 is relatively farther away from the distal end 205 of the ball-forming wire 204. An electrical arc may be formed between the sparking pin 210 and the distal end 205 of the ball forming wire 204 to cause the distal end 205 to melt and then re-solidify, thereby forming a ball shape at the distal end 205 of the ball-forming wire 204.

Apparatus 200 also includes a current detection transformer 220. The current detection transformer 220 may comprise a polyoxy-methylene thermoplastic doped with an electrically conductive additive selected from the group consisting of a non-carbon alloy, a carbon powder, and a carbon fiber. In the embodiment of FIG. 2, the current detection transformer 220 includes a magnetic core that encircles the ball-forming wire. The magnetic core preferably comprises a soft magnetic material (e.g. nickel, iron).

The current detection transformer 220 is electrically connected to an analyzing circuit 222. The analyzing circuit 222 may include an analog integrated circuit to broaden peaks in an output signal from the current detection transformer. The analyzing circuit 222 may also include an analog-to-digital converter to sample the broadened peaks. For example, a conventional PC sound card may serve as the analog-to-digital converter. Preferably, the analyzing circuit 222 is electrically connected to a display 224 that depicts an output signal of analyzing circuit 222. For example, display 224 may be a digital oscilloscope or a conventional personal computer system. The output signal of the analyzing circuit 222 is preferably responsive to the signal from the current detection transformer 220 during a period when the pin-translating actuator 214 is in the non-sparking position, and/or when the wire actuator 230 (and/or target actuator if included) is in the bonding position. Responsiveness and display of the output signal of the analyzing circuit 222 during this period is preferred because ESD damage to the target component is more likely during this period. For example, this period can include times when the ball-forming wire 204 is in contact with (i.e. has "touched down" upon) a conductive terminal or bond pad of the target component 202.

Apparatus 200 may also include an energy source for bonding the ball shape at the distal end 205 of ball-forming wire 204 to a terminal of target component 202. For example, apparatus 200 may include a conventional source of ultrasonic wave energy and an ultrasonic wave transmission path from the source of ultrasonic wave energy to the distal end 205 of the ball-forming wire 204. For example, the ultrasonic wave transmission path may include capillary tube 232.

Figure 3:
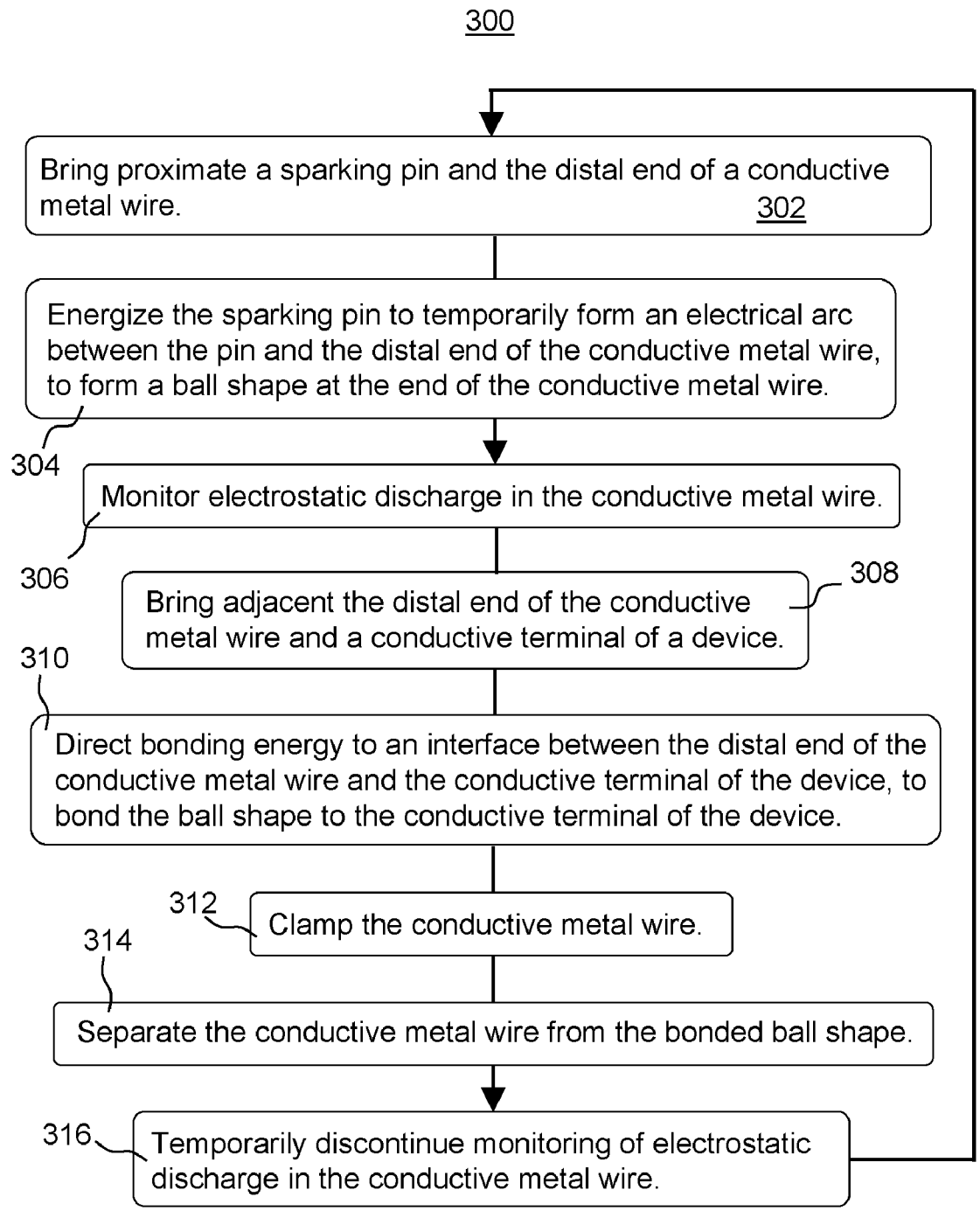
FIG. 3 depicts a method for conductive metal ball bonding according to an embodiment of the present invention.

FIG. 3 depicts a method for conductive metal ball bonding according to an exemplary embodiment of the present invention. In step 302, a sparking pin and the distal end of a conductive metal wire are brought proximate. For example, the sparking pin may be moved towards the conductive metal wire by action of a sparking pin actuator, and/or the distal end of the conductive metal wire may be moved towards the sparking pin by action of a wire actuator. In step 304, the sparking pin is energized to temporarily form an electrical arc between the sparking pin and the distal end of the conductive metal wire to form a ball shape at the distal end of the conductive metal wire.

In step 306 of FIG. 3, electrostatic discharge through the conductive metal wire is monitored. Such monitoring is preferably but not necessarily continued at least during the period described above (when responsiveness and display of the output signal of an analyzing circuit, such as analyzing circuit 222, is preferred). In certain embodiments, monitoring may comprise broadening peaks in a signal from a transformer having a magnetic core that at least partially encircles the conductive metal wire, and then digitally sampling the broadened peaks. In certain embodiments, monitoring may comprise displaying a signal from a transformer having a magnetic core that at least partially encircles the conductive metal wire, preferably when the distal end of the conductive metal wire is adjacent a conductive terminal of a device of the target component.

In step 308 of FIG. 3, and preferably at or near a beginning of the period of monitoring (if monitoring is not continuous), the distal end of the conductive metal wire and a conductive terminal of a device of the target component are brought adjacent. For example, the distal end may be moved towards the conductive terminal by action of a wire actuator, and/or the conductive terminal may be moved towards the distal end by action of an actuator that moves the target component (i.e. target actuator). Adjacent positioning of the distal end of the conductive metal wire and the conductive terminal of the device of the target component may increase the risk of ESD damage to the device of the target component.

In step 310 of FIG. 3, bonding energy is directed to an interface between the distal end of the conductive metal wire and the conductive terminal of the device of the target component, for example to bond the ball shape to the conductive terminal. For example, ultrasonic waves may be directed to the interface along a wave transmission path. Alternatively, for example, heat may be directed to the interface to increase its temperature.

In step 312 of FIG. 3, the conductive metal wire is clamped, and in step 314 the conductive metal wire is separated from the bonded ball shape (for example by forced movement of a wire actuator). Clamping may include changing an electrical potential across a piezoelectric material, for example.

In step 316 of FIG. 3, monitoring of ESD through the conductive metal wire is optionally temporarily discontinued, for example while the next electrical arc melts a new ball shape in the distal end of the conductive metal wire.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

We claim:

1. A method for bonding a conductive lead to a conductive terminal of a device the method comprising:
    bringing proximate a pin and the distal end of a conductive metal wire;
    energizing the pin to temporarily form an electrical arc between the pin and the distal end of the conductive metal wire;
    bringing adjacent the distal end of the conductive metal wire and the conductive terminal of the device;
    directing bonding energy to an interface between the distal end of the conductive metal wire and the conductive terminal of the device;
    clamping the conductive metal wire; and
    monitoring electrostatic discharge in the conductive metal wire.

2. The method of claim 1 wherein the conductive metal wire passes through a capillary tube, and further comprising at least partially evacuating the atmosphere in the capillary tube.

3. The method of claim 1 wherein the device is a magnetic recording head transducer.

4. The method of claim 1 wherein the conductive metal wire comprises gold.

5. The method of claim 1 wherein monitoring further comprises broadening peaks in a signal from a transformer having a magnetic core at least partially encircling the conductive metal wire.

6. The method of claim 5 wherein monitoring further comprises digitally sampling the broadened peaks.

7. The method of claim 1 wherein monitoring further comprises displaying a signal from a transformer having a magnetic core at least partially encircling the conductive metal wire when the distal end of the conductive metal wire is adjacent the conductive terminal of the device.

8. The method of claim 1 wherein bringing proximate the pin and the distal end of the conductive metal wire comprises moving the pin.

9. The method of claim 1 wherein bringing proximate the pin and the distal end of the conductive metal wire comprises moving the conductive metal wire.

10. The method of claim 1 wherein bringing adjacent the distal end of the conductive metal wire and the conductive terminal of the device comprises moving the conductive metal wire.

11. The method of claim 1 wherein bringing adjacent the distal end of the conductive metal wire and the conductive terminal of the device comprises moving the device.

12. The method of claim 1 wherein directing bonding energy includes directing ultrasonic waves to the interface along a wave transmission path.

13. The method of claim 1 wherein directing bonding energy comprises heating the interface.

14. The method of claim 1 wherein clamping includes changing an electrical potential across a piezoelectric material.

* * * * *